(No Model.)
A. J. SYPHER.
TRIPOD SUPPORT FOR ROCK DRILLS.
No. 407,704. Patented July 23, 1889.
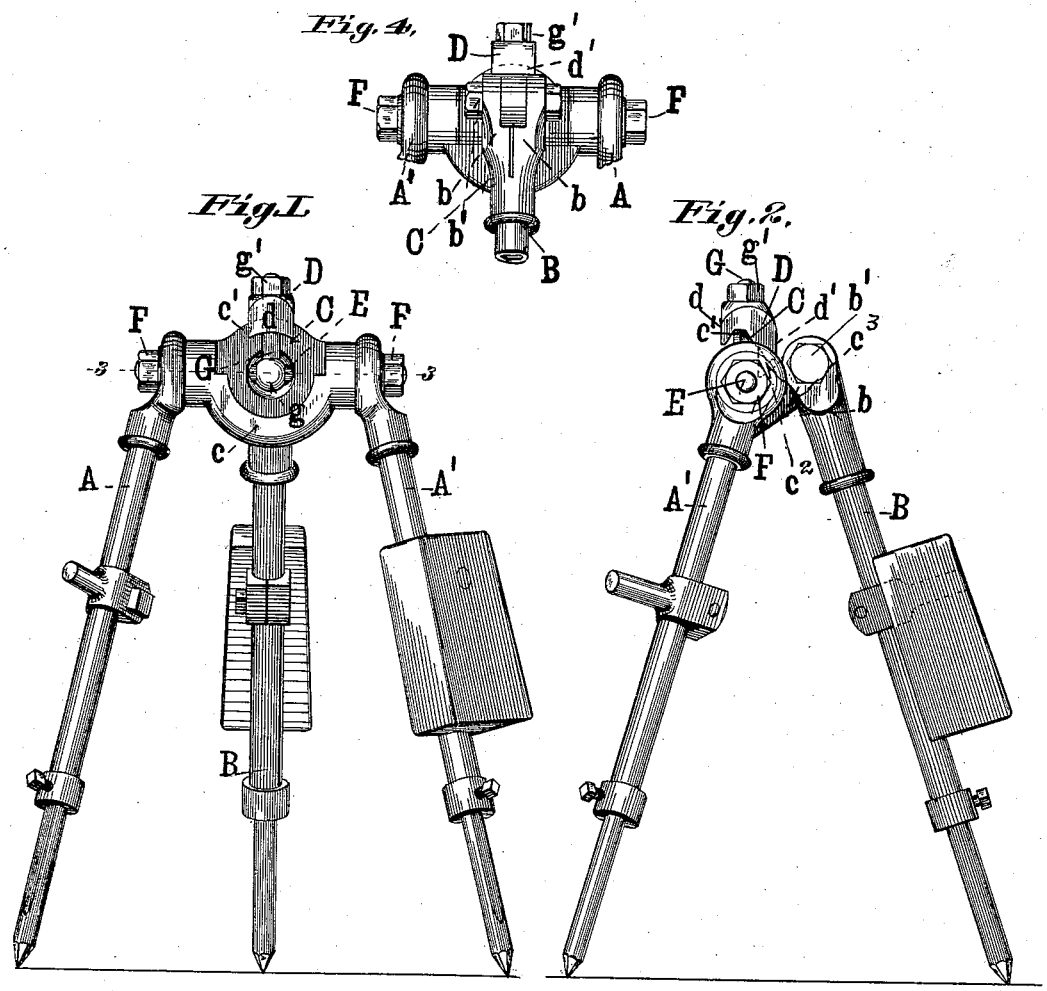
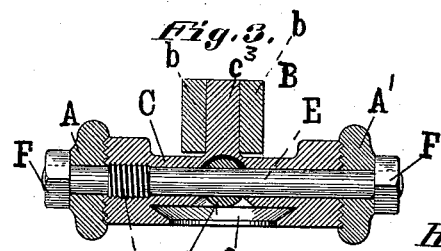

UNITED STATES PATENT OFFICE.

ABRAHAM J. SYPHER, OF IRON MOUNTAIN, MISSOURI.

TRIPOD-SUPPORT FOR ROCK-DRILLS.

SPECIFICATION forming part of Letters Patent No. 407,704, dated July 23, 1889.

Application filed November 27, 1888. Serial No. 292,022. (No model.)

*To all whom it may concern:*

Be it known that I, ABRAHAM J. SYPHER, of Iron Mountain, Missouri, have invented a new and useful Improvement in Tripod-Supports for Rock-Drills, of which the following is a full, clear, and exact description.

The invention relates to an improvement in the construction of the several parts and their combination as a whole, substantially as is herein described and claimed, aided by the annexed drawings, making part of this specification, in which—

Figure 1 is a front elevation of the improved tripod; Fig. 2, a side elevation of the tripod; Fig. 3, a horizontal section on the line 3 3 of Fig. 1; and Fig. 4, a rear elevation of the upper portion of the rear tripod-leg, including the saddle.

The same letters of reference applied to the several drawings denote the same parts.

The tripod is of a familiar construction, excepting as it may be modified or supplemented by the improvement under consideration.

A A′ represent its front legs, and B its back leg.

C represents the saddle, to which the legs are secured, and which sustains the drill. The front legs are attached to the saddle at the ends, respectively, thereof, and the back leg is attached to the saddle between its ends. The saddle in its lower front has a semicircular beveled socket $c$ to receive the trunnion (not shown) of the drill-back, and the trunnion, after being dropped into the socket, is secured therein by means of a clamp D, which secures the upper edge of the trunnion to the upper edge $c'$ of the saddle, and in a manner presently described. A leading feature of the saddle is the mode of strengthening it in the direction of its length. The saddle is perforated to receive a wrought-metal tie-bolt E, which passes horizontally through the saddle and projects from the ends thereof sufficiently to provide bearings for the front legs and to receive the nuts F F, or other equivalent means for securing the legs A A′ in position, substantially as shown.

G represents a bolt attached, by means of an eye $g$, to the tie-bolt E, and extending thence upward past the upper edge of the saddle and through the clamp D, and threaded at its upper end to receive a nut $g'$. After the drill-trunnion has been applied to the saddle the clamp is passed onto the bolt G, and then by means of the nut $g'$ the clamp D is drawn to a bearing upon the saddle and drill-back trunnion. The front portion $d$ of the clamp is shaped to overhang or otherwise to catch upon the trunnion, and the rear portion $d'$ is beveled, as indicated by the broken lines, Fig. 2, and adapted to coact with the inclined back $c^2$ of the saddle. The clamp portion $d'$ thus becomes an inclined plane moving upon a complemental inclined plane, and the clamp thereby can be drawn very tightly to a bearing upon the saddle-trunnion. An additional feature of the tripod is the means of connecting its back leg to the saddle. The back leg is attached to a bearing of its own. The saddle at the center of its back is provided with a lug $c^3$, Figs. 2 and 3, and the back leg is fastened to the lug. The lug of itself serves to stiffen the saddle transversely, and by attaching the back leg thereto the saddle is braced transversely. Thus in both directions horizontally the saddle is reenforced, and is thereby better enabled to withstand the many strains incident to the use of a drill. The back leg at its upper end is split to enable its parts $b$ $b$ to be drawn, by means of the bolt and nut $b'$, to a tight bearing upon the saddle.

The tie-bolt E, in addition to being threaded at its end where the nuts F F are applied, is also preferably threaded at $e$, as is also the saddle, thereby to enable either front leg to be detached from the saddle without necessarily detaching the other front leg therefrom.

I claim—

1. The combination of the legs A A′ B, the beveled saddle perforated and having the socket and upper edge, as described, the tie-bolt E, the eyebolt G, and the beveled clamp D, said legs being attached to said saddle, as described.

2. The combination of the beveled saddle

C, having socket $c$, the tie-bolt E, horizontally passing through the saddle, the legs A and A', secured at the respective ends thereof, the beveled clamp D, the strengthening-lug $c^3$ on the saddle, the split leg B, and bolt and nut $b'$, substantially as and for the purposes set forth.

Witness my hand this 10th day of November, 1888.

ABRAHAM J. SYPHER.

Witnesses:
C. D. MOODY,
D. W. C. SANFORD.